R. H. BOLIN.
GLASS TANK FURNACE.
APPLICATION FILED JAN. 13, 1908.

928,175.

Patented July 13, 1909.
3 SHEETS—SHEET 1.

Witnesses

Inventor

R. H. BOLIN.
GLASS TANK FURNACE.
APPLICATION FILED JAN. 13, 1908.

928,175.

Patented July 13, 1909.
3 SHEETS—SHEET 2.

Witnesses
Geo. H. Bepue.
John K. Holt.

Inventor
R. H. Bolin,
by Adrian Sizer
his Attorney

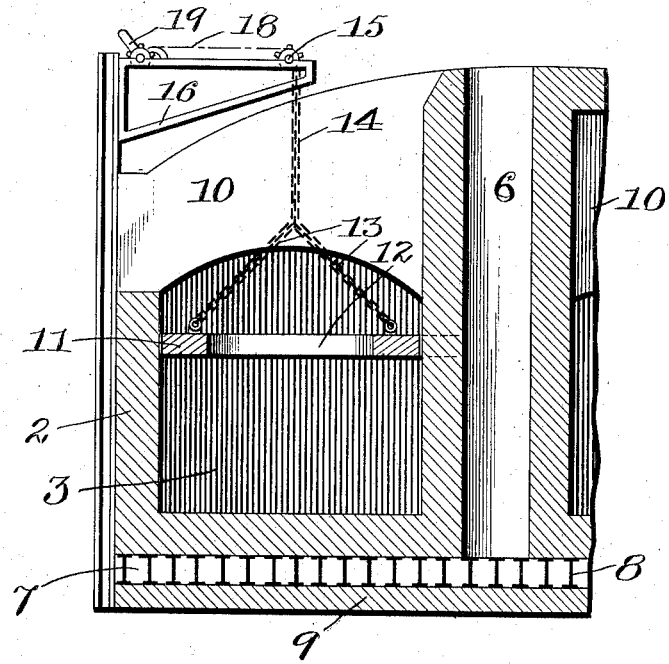
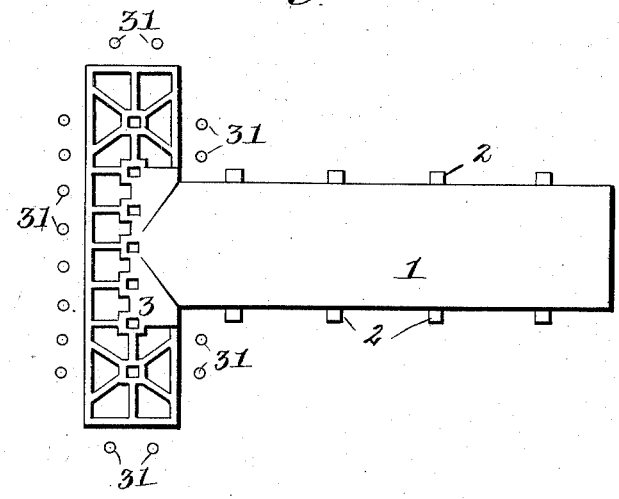

UNITED STATES PATENT OFFICE.

RICHARD H. BOLIN, OF KANE, PENNSYLVANIA.

GLASS-TANK FURNACE.

No. 928,175.

Specification of Letters Patent.

Patented July 13, 1909.

Original application filed August 12, 1907, Serial No. 388,100. Divided and this application filed January 13, 1908.
Serial No. 410,636.

*To all whom it may concern:*

Be it known that I, RICHARD H. BOLIN, a citizen of the Dominion of Canada, residing at Kane, in the county of McKean and State of Pennsylvania, have invented certain new and useful Improvements in Glass-Tank Furnaces, of which the following is a specification.

This invention relates to tank furnaces especially adapted for use in glass manufacture; the present application being a division of an application for Letters Patent of the United States filed by me August 12, 1907, for apparatus for glass manufacture, and serially numbered 388,100, Letters Patent No. 920,107, having been granted in said application May 4, 1909.

The nature and objects of said invention will be more readily understood from the following description in which reference will be had to the accompanying drawings which form a part of this application and wherein—

Figure 1:
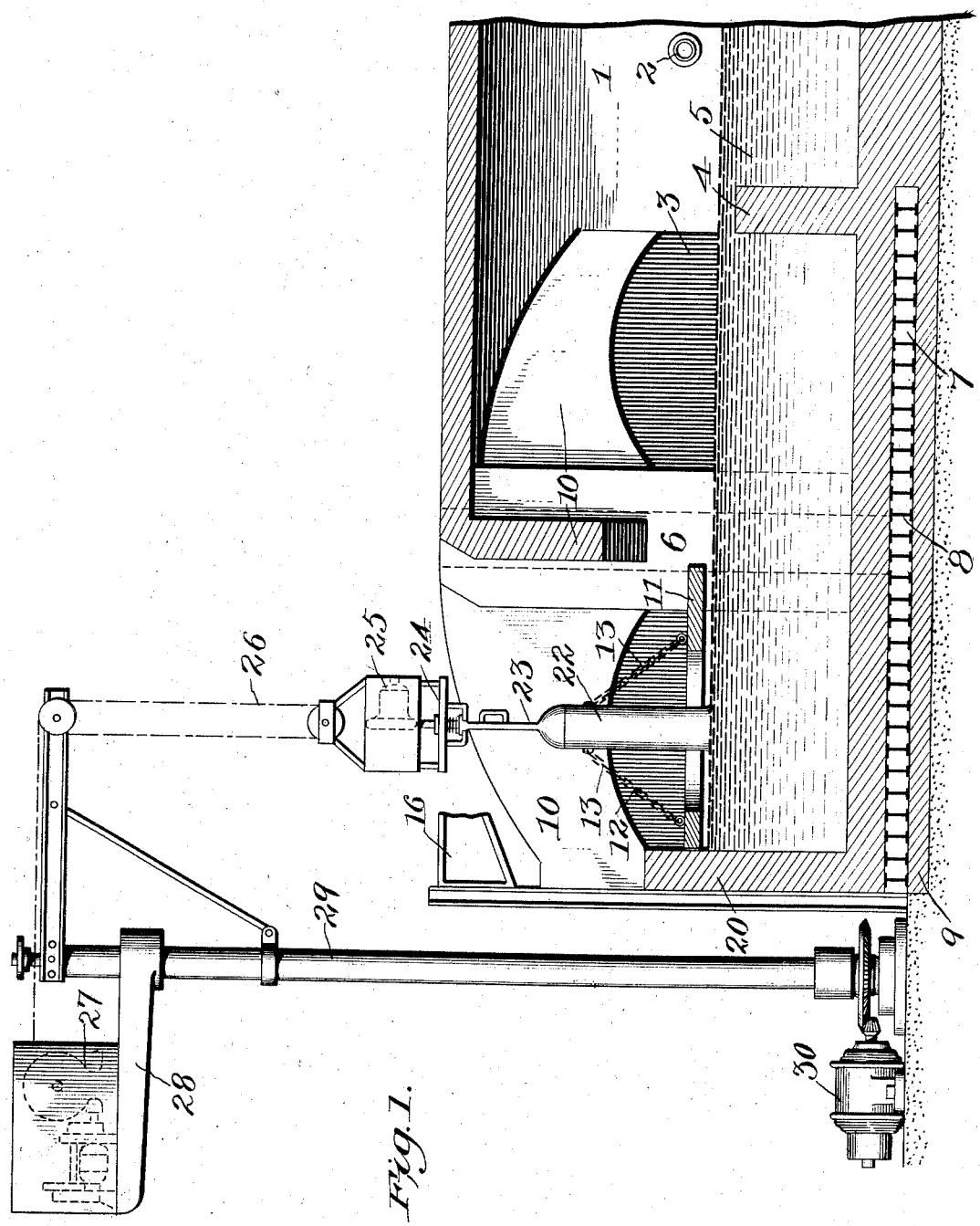
Figure 2:
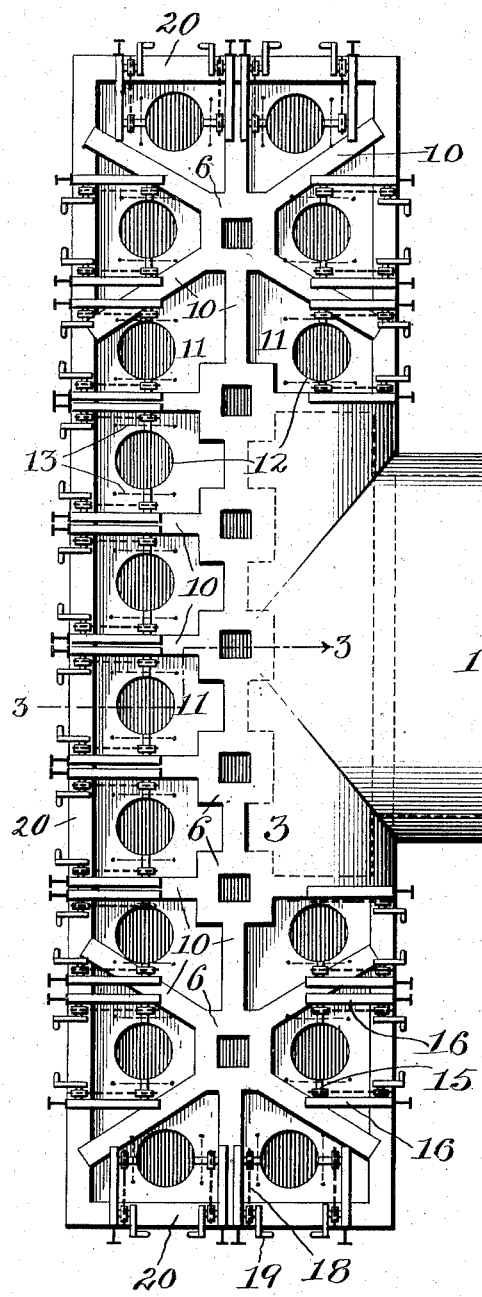

Figure 1, represents in central vertical section a portion of one form of the furnace embodying my present invention, showing in connection therewith in elevation, apparatus in the act of drawing a glass cylinder from said furnace; Fig. 2, a top plan view, partly in horizontal section of said furnace; Fig. 3, a fragmentary vertical section along line 3—3 Fig. 2, and Fig. 4, a semi-diagrammatic view of said furnace, showing an arrangement of glass drawing apparatus with relation thereto.

The tank furnace which I have herein shown comprises, a main heating chamber 1, in which glass material is reduced to a molten state by means of gas introduced thereinto through burners 2, as is common practice in the art, or in any other suitable way. Located at one end of this heating chamber 1, is the tank 3 between which and the main body of said heating chamber there is a dam 4 of suitable refractory material, the top of which is normally a few inches below the surface of the molten glass 5. This tank may extend to each side of the main heating chamber to form a T-shaped structure, as shown.

At suitable intervals down the tank 3 are located a series of vertical refractory pillars 6, which extend from the top of the tank down to the bottom thereof, and communicate each with an air space 7 in the bottom of the tank. This air space may be formed by supporting the bottom of the tank upon I-beams 8, which may be railroad rails or other suitable supports properly spaced apart and supported upon a suitable foundation 9. The pillars 6 are subjected to great heat and if solid would more rapidly deteriorate due to their slow heat radiating power when in that form. By making them hollow in the form of flues and permitting air from the outside to pass through the same, as herein described, enough heat will be radiated to greatly prolong the life of said pillars. Arches 10 of suitable refractory material extend from said flues to the side walls of the tank and between flues, and are located above the normal level of the glass, as shown. For each of the openings into the tank formed by said arches as side walls, I provide a capstone 11 consisting of a slab of refractory material having through its center a preferably circular opening 12 which may be 60 inches in diameter or any other suitable size. Each of these cap-stones is of such shape as to conform to the particular arrangement of the arches 10, forming the sides of the opening with which a particular cap-stone is used, as shown in Fig. 2.

The cap-stones may be supported each by means of chains 13 connected thereto on opposite sides of the opening 12. The chains 13 are supported by chains 14 adapted to wind on shafts 15 journaled in horizontal brackets 16 secured to uprights 17. The shafts 15 may be rotated to wind or unwind the chains in raising and lowering the cap-stones, by connecting said shafts through sprocket gearing 18, or otherwise, with winding cranks 19. Any other suitable means may, however, be employed for supporting and raising and lowering the cap-stones. The sides 20 of the tank are lower than the top of the center of the tank to permit the cap-stones to be readily placed in position and removed.

The furnace may be charged in any suitable way with the glass material to be melted, through charging opening 21.

This invention has to do with the tank furnace *per se*, but I have shown in connection therewith glass drawing apparatus to show how the furnace may be employed in glass manufacture, the said apparatus being shown in Fig. 1 in the act of drawing a glass cylinder from the mass of molten glass in the tank, where 22 indicates said cylinder, 23 the blow pipe suspended from a frame 24 which carries blowing apparatus 25 suspended by a cable 26 by which said blow pipe and its connected parts are adapted to be raised and lowered through the medium of hoisting apparatus 27, carried upon a bracket 28 of a supporting crane 29 adapted to be rotated by motor 30 geared thereto, or in any other suitable manner. A plurality of such glass drawing apparatuses are preferably located around the exterior of the tank as indicated by the small circles 31 Fig. 4, there being preferably one such apparatus for each cap-stone opening of the furnace. My present invention, however, is not confined to any special form of drawing apparatus or arrangement thereof in connection with the tank.

A furnace of the kind herein described is especially well adapted for the drawing of cylinders direct from the glass tank. Sufficient heat passes into the tank from the main body of the furnace to keep the glass at the required fluidity without the necessity of any auxiliary heating apparatus in the portion of the tank from which the glass articles are drawn. The retention of the required degree of heat in the tank proper is effected to a considerable extent by means of the cap-stones 11, which limit the heat radiation from the glass through the openings formed by the arches 10.

Having described a form of my invention, what I claim is:—

1. A glass furnace, comprising a tank for molten glass, a series of refractory hollow pillars extending from the bottom of said tank upward and opening through the bottom of said tank, and a series of refractory partition arches extending from said pillars to the side walls of said tank.

2. A glass furnace, comprising a glass tank, provided with a series of refractory partition arches, and a series of vertically movable cap-stones comprising each a slab of refractory material having an opening to permit the drawing of glass articles therethrough, and means to support said cap-stones, said cap-stones each located near the bottom of the opening in said tank bounded by said arches and above the level of the molten glass.

3. A glass furnace, comprising a main tank for molten glass, a heating chamber in which the glass is reduced to the molten state, said tank communicating directly with said chamber, a plurality of cap-stones located in said tank above the level of the glass therein, and mechanism to support said cap-stones for vertical movement.

4. A glass furnace, comprising a main tank for molten glass, a heating chamber in which the glass is reduced to a molten state, said tank communicating directly with said chamber, a plurality of cap-stones located in said tank above the level of the glass therein, each of said cap-stones comprising a slab of refractory material having an opening to permit the drawing of glass articles therethrough, and mechanism to support said cap-stones for vertical movement.

5. A glass furnace comprising a tank for molten glass, a series of hollow refractory pillars extending from the bottom of said tank upward and opening through the bottom of said tank, a plurality of refractory partition arches extending from said pillars to the side walls of said tank and between said pillars, said arches being located above the normal level of the molten glass in said tank, a plurality of cap-stones each comprising a slab of refractory material having an opening therethrough through which glass articles may be drawn from the molten glass in said tank, said cap-stones being located near the bottom of the opening into said tank formed by a plurality of said arches, the side walls of said tank and said pillars, and above the normal level of the molten glass in said tank, and mechanism to support said cap-stones for vertical movement.

6. A furnace of the character described, comprising a glass tank having a plurality of refractory pillars located therein, and a series of refractory arches extending from the said pillars to the side walls of the tank.

7. A furnace of the character described, comprising a glass tank having a plurality of refractory pillars located therein, refractory arches extending from the said pillars to the side walls of the tank, and a top portion to said tank supported in part by said pillars.

8. A furnace of the character described, comprising a glass tank having a plurality of refractory pillars located therein, refractory arches extending from the said pillars to the side walls of the tank and from pillar to pillar between adjacent pillars, and a top portion to said tank supported by said pillars and arches and the side walls of the tank.

9. A furnace of the character described, comprising a glass tank having a plurality of refractory pillars located therein, refractory arches extending from the said pillars to the side walls of the tank and from pillar to pillar between adjacent pillars, and a top portion to said tank supported by said pillars and arches and the side walls of the tank, the said arches forming the side walls of a series of openings leading from the outside from above said tank down thereinto adapted to permit the drawing of glass articles therethrough from the molten glass within said tank.

10. A glass tank furnace, comprising a tank for the molten glass, having a series of refractory pillars or piers located within the main walls of the tank and spaced apart near the drawing end of said tank and coöperating with the wall of said tank at said end to form a glass drawing zone between the said piers and the wall of the tank, the openings, created by spacing the piers, forming channels through which the molten glass reaches the said drawing zone, the said zone being common to a plurality of said channels.

In testimony whereof I affix my signature in presence of two witnesses.

RICHARD H. BOLIN.

Witnesses:
G. W. BERRY,
H. K. SHAFFER.